Figures 1, 2:
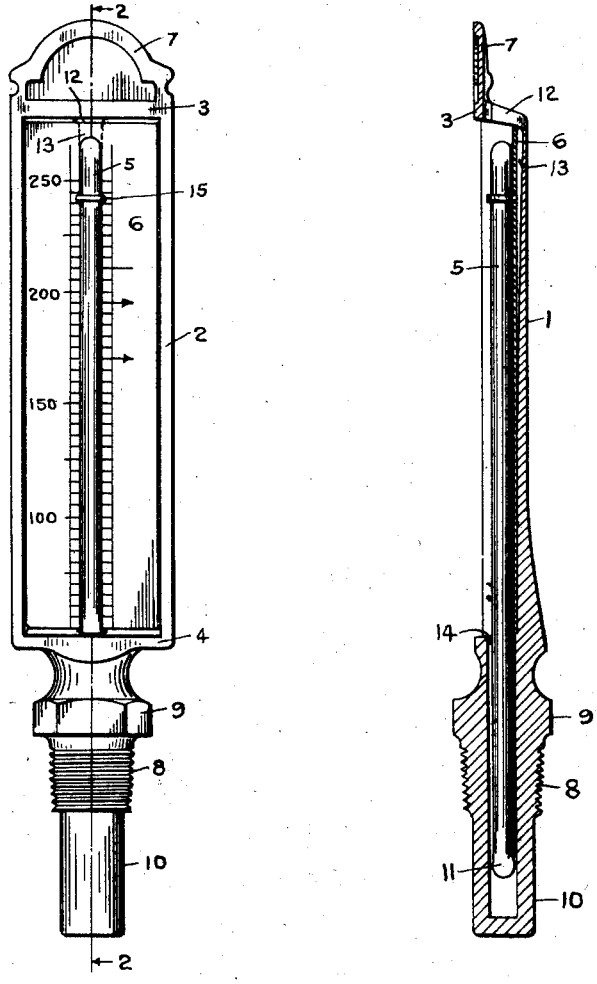

Patented June 5, 1928.

1,672,851

UNITED STATES PATENT OFFICE.

MAX E. MOELLER, OF BROOKLYN, NEW YORK, ASSIGNOR TO A. E. MOELLER COMPANY, OF BROOKLYN, NEW YORK, A COPARTNERSHIP CONSISTING OF CHARLES E. MOELLER, MAX E. MOELLER, CURT F. MOELLER, PAUL G. MOELLER, WALTER G. MOELLER, AND OTTO J. MOELLER.

THERMOMETER AND METHOD OF MAKING THE SAME.

Application filed March 28, 1922. Serial No. 547,405.

The improvements relate to frames for thermometers and similar articles, and to the methods employed to produce and assemble the parts of the frame and the thermometer and frame and make up the complete instrument. Among their objects are the production of a simpler, stronger, and more efficient instrument and the rendering of the operations involved in its manufacture simpler, less expensive and less liable to produce breakage than present methods, and also capable of being performed by unskilled labor.

The improvements are illustrated in the accompanying drawings, in which Figure 1 is a front view of a thermometer embodying the improvements, and Fig. 2 a vertical section on the line 2—2 of Fig. 1 looking in the direction indicated by the arrows in that figure.

The main casing consists of the back 1, sides 2, top 3, and bottom 4, the sides extending a suitable distance above the bottom to receive the thermometer tube 5 and its scale plate 6, and the front being preferably left open. An extension 7 at the top provides an opportunity for ornamentation and the display of the name of the maker or other information. When the thermometer is used for taking atmospheric temperatures this extension may be provided with a suitable hanger.

The instrument illustrated is intended primarily for use in connection with vessels in which fluids are heated, and is adapted to be threaded into an opening in one of the walls of the vessel by means of the exteriorly threaded shank 8 and nut 9 cast integral with the hollow stem 10. The casting comprising the parts 8, 9, and 10 is cored centrally so as to produce an elongated aperture to receive the lower part of the stem and the bulb 11 of the thermometer proper, and it is with the formation of these parts and the assembling of the thermometer therewith that the principal features of the present improvements have to do.

The best method of making the thermometer frame or casing and assembling it with the thermometer and its scale at present employed, is to cast the frame with a cored stem at the bottom approximately half as long as the tubular extension below the bottom 4, then cast a thimble with a nut and threaded portion on its exterior and fit it over the lower portion of this stem, both stem and thimble being bored or reamed, the thermometer tube being first inserted through the stem and then secured in position on its scale. This method involves the making, grinding, and boring and reaming of two castings and the fitting of them together, and the positioning of the thermometer tube with respect to its scale after both have been inserted in the frame, which leads to inaccuracies and other bad results.

With the present improvements an opening is made at 12, with a groove 13 extending therefrom toward the bottom of the casing and gradually diminishing in depth. This may be done in the casting, and it provides a means for inserting and guiding a drill or reaming tool through the casing and into the extension for the purpose of boring or reaming the bore intended to receive the lower portion of the thermometer stem. Then after the extension is bored the thermometer and its scale, which have previously been secured together and accurately adjusted, may be inserted by simply passing the extending stem and bulb at its extremity into the bore of the extension and slipping the plate over the top 3 and along it until it springs into the recess of the frame, when its lower edge has reached the bottom. The thermometer may now be secured in the frame in any desired manner, but it will be found that after it has been inserted in the way just described it will not fall out accidentally, since the front edge of the part 3 is far enough outside the outer edge of the bore 14 to require a slight flexure of the thermometer and its plate to permit the back of the plate to pass over the thermometer. The end 3 is beveled inwardly from its front edge to the back 1 and the end 4 is similarly beveled, so that the plate 6 will fit snugly in the bottom of the recess provided for it. A band 15 extending around the glass thermometer tube and secured to the plate unites the two, and as these parts are secured together before being inserted in the frame or casing it is possible to test the thermometer and fix it in its proper position with respect to the scale without difficulty.

By the means and method herein described the extension which receives the lower part of the thermometer tube is bored with accuracy after the case has been cast, and does not require to be reamed, as in the case of a bore that is cast. It may, however, be cast and reamed if desired, but reaming tools are short lived, and a bore that is cast and reamed is not usually as true or as accurate as one that is drilled, owing to the shrinkage of the casting and other reasons. In this manner a better instrument is produced at a lower cost of manufacture due to the saving in labor and tools.

When the bore of the extension is formed in the casting a core in the form of a rod or pin is positioned in the mold so that it will form the opening at the top of the casing and the guiding groove extending therefrom toward the bottom thereof and the bore of the extension.

What I claim is:

1. The herein described method of making and assembling thermometers and the like having an open recess for the scale plate and the upper part of the thermometer tube, and a hollow extension for the lower part of the said tube which consists in casting the frame or casing in which the recess is located and the extension in one piece, and forming an opening on the side of the recess opposite the extension, through which a drill may be passed, then passing a drill through said opening and boring the extension to form a recess therein for the lower portion of the tube.

2. The herein described method of making and assembling thermometers and the like having an open recess for the scale plate and the upper part of the thermometer tube, and a hollow extension for the lower part of the said tube which consists in casting the casing in which the recess for the thermometer tube and its plate is located and the extension in one piece, and providing a core extending through the wall of one side of the recess and the opposite wall into the extension to form an opening at the first named side and a bore in the extension to receive the lower part of the tube, then passing a tool through the opening and into the said bore and boring the same.

3. The herein described method of making and assembling thermometers and the like having an open recess for the scale plate and the upper part of the thermometer tube, and a hollow extension for the lower part of the said tube which consists in forming the casing with the extension with the recess to receive the upper part of the thermometer and the scale plate, and the hollow extension to receive the lower part of the thermometer tube in one piece, then securing the thermometer and the scale plate together, and then inserting the lower end of the tube in the extension with the scale projecting above the recess and passing them downwardly until the plate is coincident with and positioned within the said recess.

4. The herein described method of making and assembling thermometers and the like having an open recess for the scale plate and the upper part of the thermometer tube, and a hollow extension for the lower part of the said tube which consists in casting the frame or casing in which the recess is located and the extension in one piece, and forming an opening on the side of the recess opposite the extension through which a drill may be passed, and a groove extending therefrom in the direction of the extension and in line with its longitudinal axis, then passing a drill through said opening and boring the extension to form a recess therein for the lower portion of the tube.

5. The herein described method of making and assembling thermometers and their frames, which consists in forming the frame with a recess to receive the thermometer tube and its scale plate and with an extension to receive a portion of said tube, passing a drill through the said recess and boring the said extension so that the bore thus formed communicates with the recess, securing the tube in position on its scale, then passing the extending end of the tube into the bore and simultaneously inserting both scale plate and the portion of the tube thereon in the recess.

6. The herein described article of manufacture, to wit, a thermometer with protecting frame, consisting of a frame having a recess to receive the thermometer tube and its scale plate, a thermometer tube and scale plate therein, said frame having an extension receiving the lower portion of said tube and a bore therein alined with the recess formed by passing a drill through said recess and boring said extension and the said lower portion of the tube being passed into said bore.

7. In the article defined in claim 6, the lower end of the extension being left imperforate.

8. In the article specified in claim 6, the said tube being secured in position on its scale and having fastening means extending through said scale and into the portion of the recess behind the scale.

9. The herein described method of finishing thermometers and assembling them and their scale plates with protecting frames, which consists in first forming a protecting frame with an elongated recess therein to receive the thermometer and its scale, forming on said frame an extension substantially in line with the recess and at one end thereof, making an aperture at the side of the recess opposite the said extension to receive a drilling or boring tool, then passing the said tool through said opening and through said recess into the extension to form a bore in said extension substantially in plane with the recess and to receive the end of a thermometer stem, then passing a thermometer stem and a scale plate secured thereto into said recess from a point outside the plane thereof and simultaneously passing the lower part of the stem into the bore of the extension.

10. The herein described method of making a protecting frame for thermometers and the like, which consists in first forming a protecting frame with an elongated recess therein to receive the thermometer and its scale, forming on said frame an extension substantially in line with the recess, and at one end thereof, making an aperture at the side of the recess opposite the said extension to receive a drilling or boring tool, then passing the said tool through said opening and through said recess into the extension to form a bore in said extension substantially in plane with the recess to receive the end of a thermometer stem.

11. The herein described method of making a protecting frame for thermometers and the like which consists in first forming a protecting frame with an elongated recess therein to receive the thermometer and its scale, forming on said frame an extension substantially in line with the recess, and at one end thereof, making an aperture at the side of the recess opposite the said extension to receive a drilling or boring tool, and forming a sub-recess or groove extending along the bottom of said recess from the aperture toward the axis of the extension, then passing the said tool through said opening and through said recess into the extension to form a bore in said extension substantially in plane with the recess to receive the end of a thermometer stem.

12. The herein described method which consists in locating and making an aperture at one end of a recessed casting in line with a projecting portion to be bored, passing a boring tool through the aperture and recess and into and through the wall opposite said aperture and boring out said projecting portion until a bore is formed in line with a predetermined portion of said recess, using the said aperture as a gage to determine the direction of said bore while boring said projecting portion.

Witness may hand this 24 day of March, 1922, at the city of New York, in the county and State of New York.

MAX E. MOELLER.